June 19, 1962 G. C. HAND, JR., ET AL 3,040,306
CONTOUR DATA RECORDING SYSTEM
Filed Dec. 4, 1958
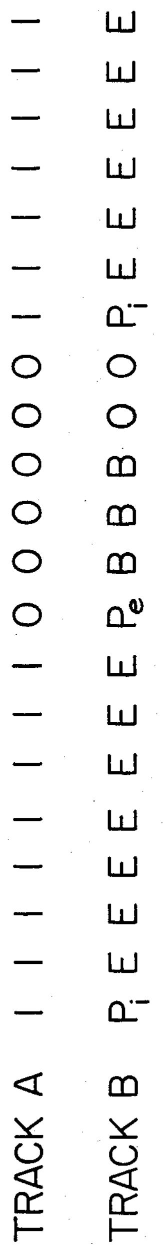
INVENTORS
GEORGE C. HAND JR.
BY JACOB H. KUBANOFF
Laurence S. Epstein
ATTORNEYS United States Patent Office 3,040,306
Patented June 19, 1962

3,040,306

CONTOUR DATA RECORDING SYSTEM

George C. Hand, Jr., Bridgeport, and Jacob H. Kubanoff, Philadelphia, Pa., assignors, by mesne assignments, to the United States of America as represented by the Secretary of the Navy Filed Dec. 4, 1958, Ser. No. 778,271
3 Claims. (Cl. 340—174.1)

This invention relates generally to recording apparatus and more particularly to an arrangement of data on a recording means specifically operable with a master terrain model system.

This invention, while generally applicable, is preferably utilized in conjunction with the system disclosed patent applications Serial Nos. 775,327 filed November 18, 1958, and the elements which are the subjects of patent applications Serial Nos 775,327 filed November 20, 1958, 775,328 filed November 20, 1958, 775,331 filed November 20, 1958, 776,650 filed November 26, 1958, now Patent No. 2,981,123, application Serial No. 776,652 filed November 26, 1958, now Patent No. 2,991,663, and Patent No. 2,876,562.

With the aforesaid system, the complexity of the digital data storage problem lies in the extremely high degree of liability required for the realization of an accurate model and in the magnitude of the data stored. Every effort had to be made to compress the data into a compact form without sacrificing the necessary reliability.

It is therefore an object of the instant invention to provide a reliable compact data storage scheme.

Another object of the invention is to provide a low-cost data storage scheme.

Yet another object of the invention is to provide an easy-to-handle self-correcting data storage scheme.

Other objects and many of the attendant advantages of this invention will be readily appreciated as the same becomes better understood by reference to the following detailed description when considered in connection with the accompanying drawings wherein:

The FIGURE depicts the usual arrangement of bits on the inventive storage device.

In storing data digital which is derived from a contour map of the type disclosed in patent application 493,585, now Patent No. 2,876,562 two general techniques are available. In the first an incremental account of elevation is stored. With this system, any error would make all subsequent readings in error. The second general technique is to record the complete value of each elevation. This technique, while very accurate, requires that a large quantity of storing means be available.

A study of contour maps has indicated that the average map is about 25% contour lines and 75% areas of constant elevation. Consequently the instant inventive technique of sensing to determine elevation and counting the sensing intervals between changes of elevation was derived. With this system redundant information is omitted.

Referring to the figure, the arrangement of data on the storing medium is shown. In the preferred form of the invention a two-track magnetic tape is utilized. Further, the information is recorded serially on the tape in the sequence elevation-number of spaces—next elevation—etc. With regard to the nomenclature on the figure, ones indicate the read elevation operation and the interval parity check; zeros indicate the read interval operation and the elevation parity check; E's represent the binary number associated with the elevation; B's represent the binary number representing the interval minus 1; $P_e$ equals parity check for elevation; and $P_i$ is the parity check for the number of zeros for intervals.

As is indicated parity checks are applied to both parts of the significant data. A parity check is accomplished by counting the number of "1's" in a binary number and then placing a "1," or a "0" in the parity check position to make the sum of the "1's" either odd or even. Then if in processing a pulse is lost, the sum of "1's" will no longer agree with the parity test and an error is indicated.

For the elevation reading the parity check is sufficient and when an error is indicated that particular elevation reading is ignored. This will cause only a minor distortion in the model surface which is corrected as soon as the next elevation signal is encountered. Smoothing would further minimize this type of error.

However, an error in interval count is considerably more serious for it is cumulative and results in a distortion along an entire scan line. Therefore, more precautions are taken. The information is recorded twice in different tracks and by different codes, one of which has a parity check on it. The checking operation is as follows:

If the number of zeros in track A agree with the binary number (one) in track B, that value is used regardless of the parity check. If they differ, the parity check determines which number should be used. This yields very high reliability and should result in accurate model information.

Obviously many modifications and variations of the present invention are possible in the light of the above teachings. It is therefore to be understood that within the scope of the appended claims the invention may be practiced otherwise than as specifically described.

We claim:

1. A method of storing terrain data consisting of the steps of providing a storage tape, dividing said storage tape into two channels, recording on the first of said channels more than one type of information serially and recording on the second of said channels a signal identifying the type of information recorded on the first channel.

2. A method of storing terrain data consisting of the steps of providing a storage tape, dividing said tape into two channels, recording on the first of said two channels elevation data and sensing interval data alternately and recording on the second of said two channels a signal identifying what is being recorded on the first channel.

3. A method of storing terrain data consisting of the steps of providing a storage tape, dividing said tape into two channels, recording on the first of said two channels elevation data, sensing interval data and parity check data on elevation and sensing intervals, and recording on second of said two channels a signal identifying what is recorded on said first channel.

References Cited in the file of this patent

UNITED STATES PATENTS 2,628,346 Burkhart ---------------- Feb. 10, 1953
2,714,202 Downing ---------------- July 26, 1955